US006318523B1

United States Patent
Moradmand et al.

(10) Patent No.: US 6,318,523 B1
(45) Date of Patent: Nov. 20, 2001

(54) FLEXIBLE MONOTUBE VALVE WITH DIGRESSIVE PERFORMANCE AND INDEPENDENT LOW SPEED ORIFICE

(75) Inventors: Jamshid Kargar Moradmand, Dayton, OH (US); Hamed Khalkhali, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/513,126

(22) Filed: Feb. 25, 2000

(51) Int. Cl.$^7$ ........................................................ F16F 9/49
(52) U.S. Cl. .................... 188/280; 188/322.15; 188/317; 188/282.8; 188/322.22
(58) Field of Search ................... 188/322.13, 322.15, 188/313, 316, 317, 280, 282.1, 282.8, 322.22

(56) References Cited

U.S. PATENT DOCUMENTS

| | | | | |
|---|---|---|---|---|
| 1,028,400 | * | 6/1912 | Stanton | 188/322.15 |
| 2,472,840 | * | 6/1949 | Lewton | 188/322.15 |
| 2,717,058 | * | 9/1955 | Brundrett | 188/322.15 |
| 2,740,500 | * | 4/1956 | Brundett et al. | 188/322.15 |
| 3,007,550 | * | 11/1961 | Long | 188/322.15 |
| 3,232,390 | * | 2/1966 | Chano | 188/322.15 |
| 3,302,756 | * | 2/1967 | McIntyre | 188/322.15 |
| 3,706,362 | * | 12/1972 | Faure | 188/282 |
| 3,730,305 | * | 5/1973 | Fouts | 188/322.15 |
| 3,833,248 | * | 9/1974 | Wossner et al. | 293/86 |
| 3,874,487 | * | 4/1975 | Keijzer | 188/322.15 |
| 4,352,417 | * | 10/1982 | Stinson | 188/322.15 |
| 4,401,196 | * | 8/1983 | Grunei | 188/282 |
| 4,433,759 | * | 2/1984 | Ihinose | 188/282 |
| 4,460,074 | * | 7/1984 | Muller et al. | 188/322.14 |
| 4,610,332 | * | 9/1986 | Mourray | 188/322.15 |
| 4,615,420 | * | 10/1986 | Mourray | 188/322.15 |
| 4,775,038 | * | 10/1988 | Unnikrishnan et al. | 188/320 |
| 4,809,829 | * | 3/1989 | Hummel et al. | 188/322.15 |
| 4,964,493 | * | 10/1990 | Yamaura et al. | 188/322.15 |
| 4,993,524 | * | 2/1991 | Grundei et al. | 188/322.22 |
| 5,072,813 | * | 12/1991 | Yoshioka et al. | 188/322.15 |
| 5,085,300 | * | 2/1992 | Kato et al. | 188/322.15 |
| 5,154,263 | * | 10/1992 | Lizell | 188/299 |
| 5,219,414 | * | 6/1993 | Yamaoka | 188/284 |
| 5,325,942 | * | 7/1994 | Groves et al. | 188/282 |
| 5,570,762 | * | 11/1996 | Jentsch | 188/322.15 |
| 5,738,190 | * | 4/1998 | Deferme | 188/280 |
| 5,823,306 | * | 10/1998 | de Molina | 188/322.15 |
| 5,921,360 | * | 7/1999 | Moradmand | 188/322.22 |
| 6,085,876 | * | 7/2000 | Deferme | 188/322.15 |

* cited by examiner

Primary Examiner—Christopher P. Schwartz
Assistant Examiner—Benjamin A. Pezzlo
(74) Attorney, Agent, or Firm—Robert M. Sigler

(57) ABSTRACT

A piston valve assembly for regulating the flow of fluid through a mono-tube fluid vehicle damper is provided. The assembly includes a piston rod and a piston end having opposing first and second surfaces secured to the piston rod by a connector. A first outer annular seat is spaced radially from the piston rod and extends from the first surface. At least one first fluid passageway connects a first opening between the piston rod and the first outer annular seat and the second surface for providing fluid communication therebetween. A first blow-off valve has a hollow cylindrical portion with a first flange extending transversely from an end thereof with the first flange adjacent to the first outer annular seat when the first blow-off valve is in a closed position. The piston rod and connector secure the blow-off valve to the piston end. The first blow-off valve is movable to an open position away from the first surface. A first low speed bypass valve is interposed between the at least one first passageway and the second surface for permitting fluid to exit the at least one first fluid passageway past the first blow-off valve when the first blow-off valve is in the closed position. A first helical spring engages the first blow-off valve for biasing the first blow-off valve to the closed position. The blow-off valve provides digressive performance during operation of the damper. The blow-off valve provides increased digressive performance during operation of the damper.

2 Claims, 5 Drawing Sheets

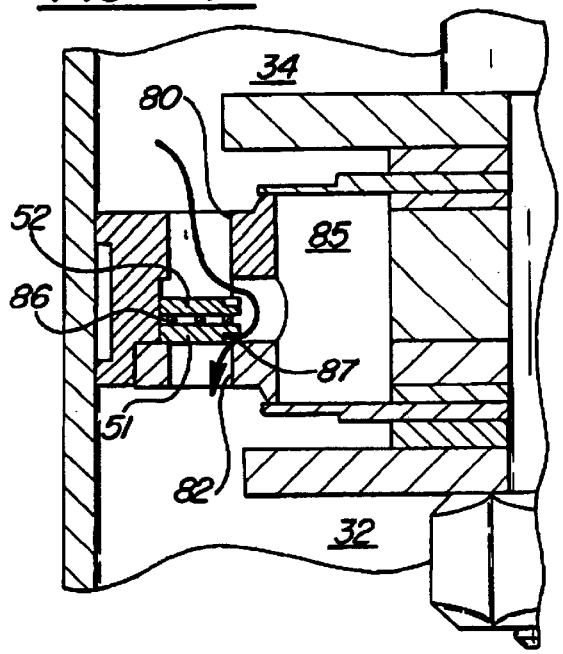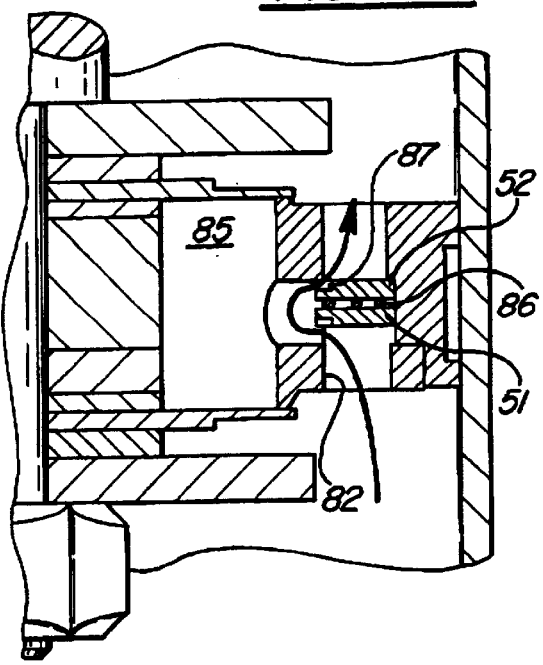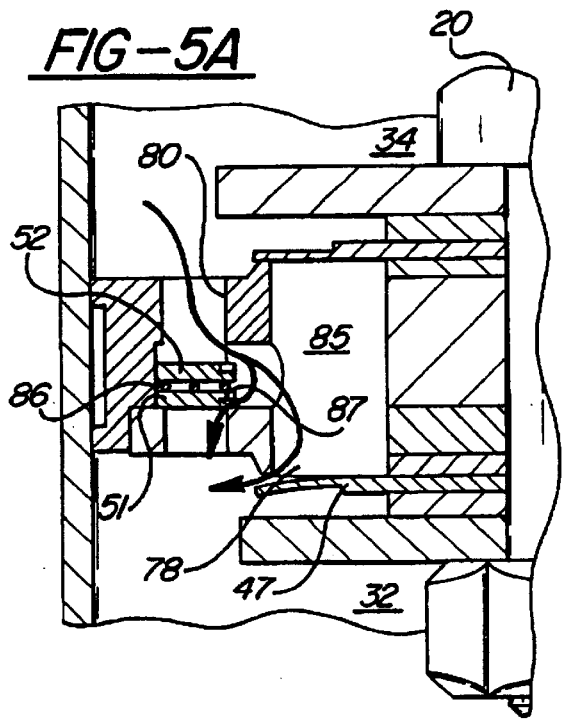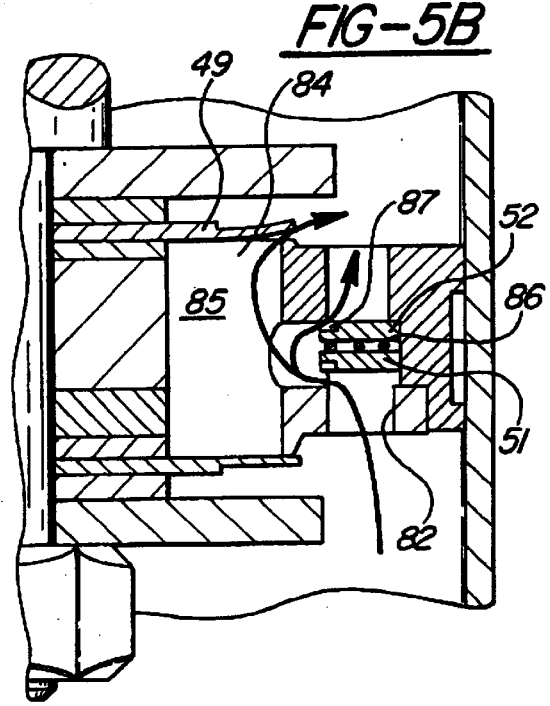

FLEXIBLE MONOTUBE VALVE WITH DIGRESSIVE PERFORMANCE AND INDEPENDENT LOW SPEED ORIFICE

TECHNICAL FIELD

This invention relates to fluid dampers for vehicles, and more specifically, to a blow-off valve for use in a mono-tube to provide digressive performance during operation of the damper.

BACKGROUND OF THE INVENTION

Fluid vehicle dampers, such as hydraulic shock absorbers and struts, provide a smooth ride by absorbing forces that are generated by an uneven road surface. Two common types of vehicle fluid dampers are mono-tube and twin tube shock absorbers, each of which have a cylinder and piston with a piston rod. The piston divides the shock absorber into compression and rebound fluid chambers and regulates the flow of fluid from one chamber to another thereby achieving particular ride handling characteristics. Typically, the piston has a compression and rebound valve assembly located on opposing surfaces that regulate fluid flow during the compression and rebound strokes. By modifying the valve assemblies, the ride handling characteristics may be calibrated.

It is desirable to have different rates of piston damping depending on vehicle ride conditions. For example, during vehicle cornering maneuvers in which the piston undergoes low speed compression, it is desirable to have a stiff ride handling characteristic, which manifests itself as a steep curve on a piston force v. piston velocity graph. Conversely, when the vehicle travels over pot holes at relatively high vehicle speeds in which the piston undergoes high speed compression, it is desirable to have a soft ride handling characteristic, which manifests itself as a flat curve on a piston force v. piston velocity graph. Further, it is desirable to have independent low and high speed damping rates that may be calibrated easily. One way to best achieve independent rates of damping is to provide a piston valve assembly having digressive performance, that is, a piston valve assembly which provides generally independent and distinct damping rates during low and high speed piston compression with very steep and very flat curves, respectively. Ease of calibration may be achieved when a wide range of damping rates may be attained by varying the valve assembly components. Prior art mono-tube designs have had very limited digressive performance with interdependent low and high speed damping rates thereby compromising versatility of ride handling characteristics at low and high vehicle speeds. Therefore, what is needed is a piston valve assembly that provides increased digressive performance.

SUMMARY OF THE INVENTION

The present invention provides a piston valve assembly for regulating the flow of fluid through a mono-tube fluid vehicle damper. The assembly includes a piston rod and a piston end having opposing first and second surfaces secured to the piston rod by a connector. A first outer annular seat is spaced radially from the piston rod and extends from the first surface. At least one first fluid passageway connects a first opening between the piston rod and the first outer annular seat and the second surface for providing fluid communication therebetween. A first blow-off valve has a hollow cylindrical portion with a first flange extending transversely from an end thereof with the first flange adjacent to the first outer annular seat when the first blow-off valve is in a closed position. The piston rod and connector secure the blow-off valve to the piston end. The first blow-off valve is movable to an open position away from the first surface. A first low speed bypass valve is interposed between the at least one first passageway and the second surface for permitting fluid to exit the at least one first fluid passageway past the first blow-off valve when the first blow-off valve is in the closed position. A first helical spring engages the first blow-off valve for biasing the first blow-off valve to the closed position. The blow-off valve provides digressive performance during operation of the damper.

Accordingly, the present invention provides a piston valve assembly that provides increased digressive performance.

BRIEF DESCRIPTION OF THE DRAWINGS

FIGS. 4 and 4B illustrate the piston valve assembly shown in FIG. 2 before deflection of the discs;

FIGS. 5A and 5B illustrate the piston valve assembly shown in FIG. 2 after deflection the discs;

DESCRIPTION OF THE PREFERRED EMBODIMENT

Figure 1:
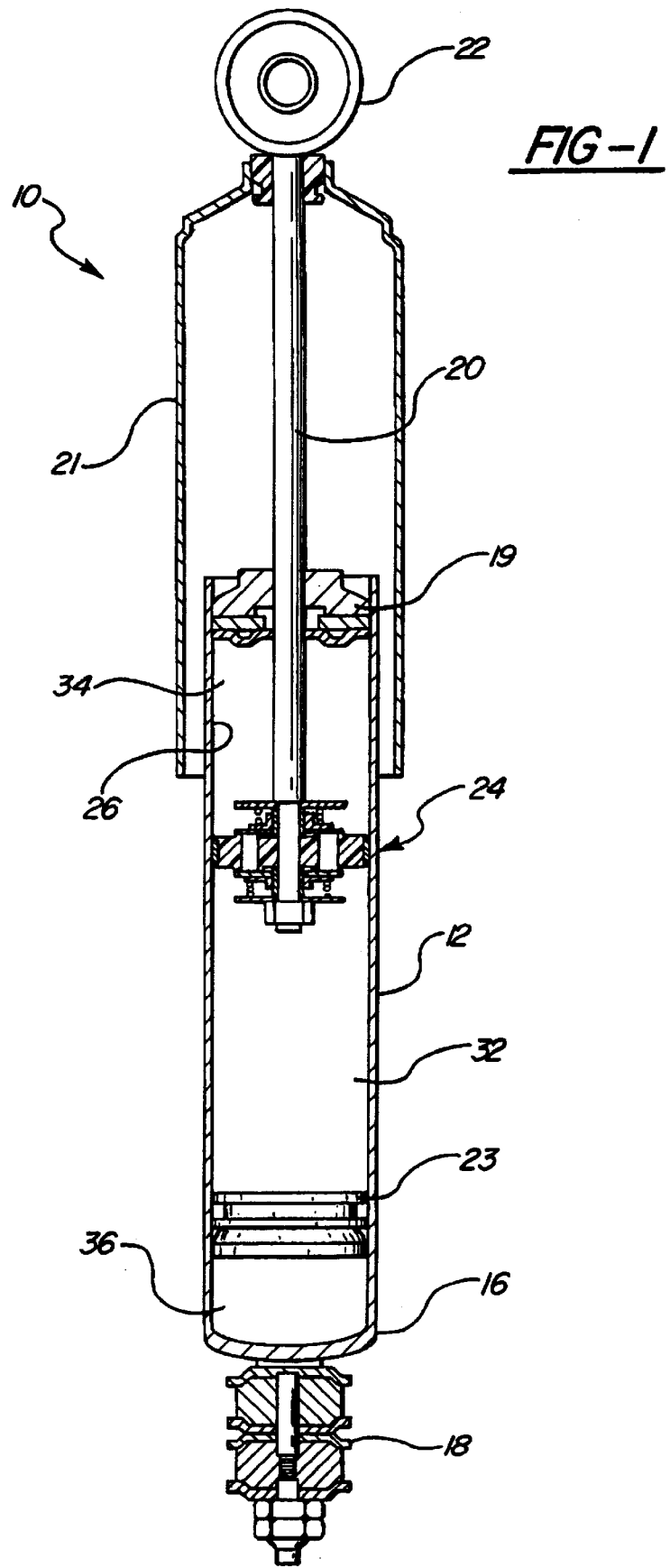
FIG. 1 is a cross-sectional view of a fluid vehicle damper according to the present invention.

A fluid vehicle damper or, more specifically, a mono-tube shock absorber is generally shown at 10 in FIG. 1. The damper 10 has a reservoir tube 12 that forms a cylinder. A lower portion 16 of reservoir tube 12 has a lower connection 18 for attachment to a suspension component (not shown). An upper portion 19 of reservoir tube 12 slidably receives a piston rod 20 to which an upper connection 22 is attached. A dust shield 21 is supported on piston rod 20 and covers piston rod 20 and upper portion 19 to prevent debris from inhibiting the movement of piston rod 20. Upper connection 22 is typically attached to a portion of the vehicle's frame (not shown). The suspension component (not shown) moves relative to the frame (not shown) as the vehicle travels over uneven road surfaces thereby moving piston rod 20 within cylinder 12.

A valve body, or a piston valve assembly, is schematically shown at 24 and is attached to rod 20 opposite upper connection 22. An interior wall 26 of cylinder 12 slidably receives piston valve assembly 24. Piston valve assembly 24 is typically formed from powdered metal. Mono-tube shock absorbers 10 have a gas cup 23 disposed within cylinder 12 proximate to lower portion 16. Piston valve assembly 24 moves toward gas cup 23 during compression of shock absorber 10 and moves away from gas cup 23 during rebound.

Piston valve assembly 24 defines a compression chamber 32 and a rebound chamber 34. Hydraulic fluid fills chambers 32, 34 and dampens forces as the fluid passes through piston valve assembly 24 and its associated valve assemblies, which are discussed in more detail below. Gas cup 23 separates compression chamber 32 from a pressure chamber 36 that is filled with air. Gas cup 23 shifts up and down during compression and rebound of piston valve assembly 24 to compensate for the volume of piston rod 20 entering and exiting cylinder 12 and also compensates for fluid expansion and contraction due to temperature variations.

Figure 2:
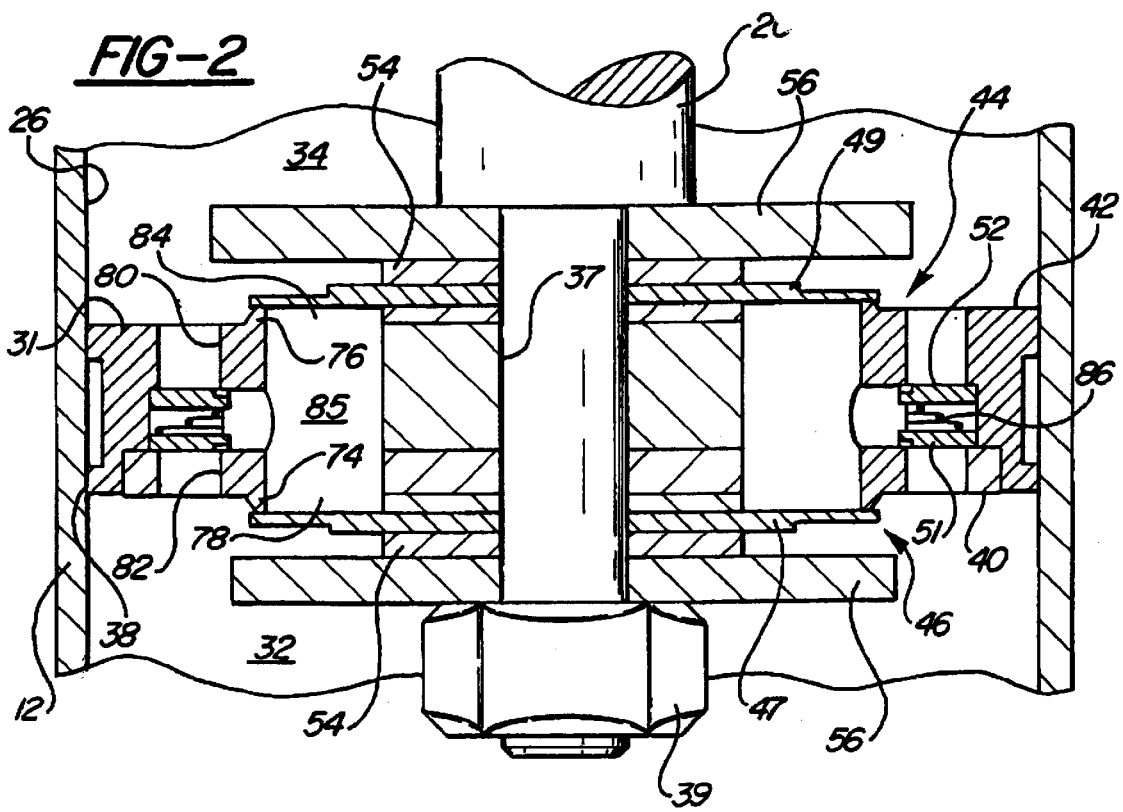
FIG. 2 is a piston valve assembly having deflective rebound and compression discs with low speed bypass valves.
Figure 3:
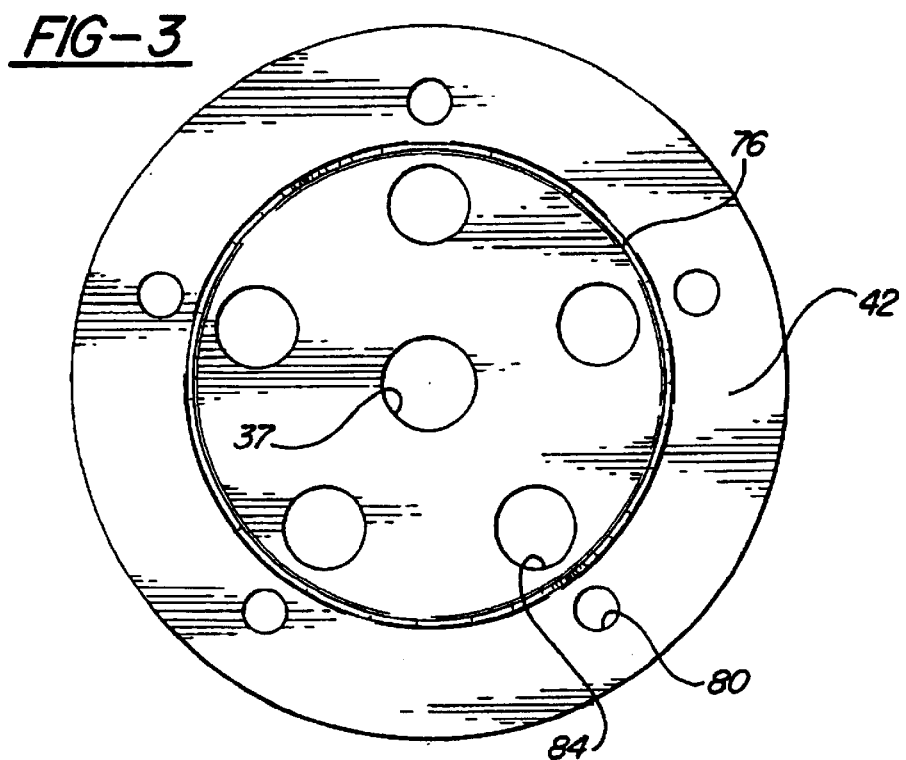
FIG. 3 is an end view of a piston end.

FIGS. 2–5B illustrate the fluid flow through a typical mono-tube piston valve assembly. Piston valve assembly 24 includes a piston end 31 which has an outer surface 38 adjacent interior wall 26 of cylinder 14 and first 40 and second 42 opposing surfaces. Piston end 31 has a central bore 37 that receives piston rod 20. A connector 39, for example a nut, is secured to piston rod 20 to retain piston end 31. Compression chamber 32 and rebound chamber 34 are adjacent first 40 and second 42 surfaces, respectively, also referred to as the compression 40 and rebound 42 surfaces. Referring to FIG. 2, piston valve assembly 24 includes a compression valve assembly 44 that regulates the flow of fluid from compression chamber 32 to rebound chamber 34 during compression of damper 10 and is the primary control of damping during compression. Piston valve assembly 24 also includes a rebound valve assembly 46 that regulates the flow of fluid from rebound chamber 34 to compression chamber 32 during rebound of damper 10.

Valve assemblies 44, 46 include high speed bypass valve assemblies that comprise deflective discs 47, 49 and low speed bypass valve assemblies that comprise orifice discs 51, 52 to provide different damping rates at high and low speeds. Deflective discs 47, 49 and orifice discs 51, 52 are typically made from a high strength spring steel. Deflective discs 47, 49 are adjacent to first 40 and second 42 surfaces, respectively, and a spacer disc 54 and stop 56, which are all retained between piston rod 20 and connector 39.

First 40 and second 42 surfaces of piston end 31 have outer annular seats 74, 76, respectively, for sealing engagement with deflective discs 47, 49. Outer annular seats 74, 76 extend from first 40 and second 42 surfaces and define first 78 and second 84 openings between outer annular seats 74, 76 and piston rod 20. At least one first fluid passageway 80 connects first opening 78 and second surface 42 for providing fluid communication therebetween during compression of damper 10. Similarly, at least one second fluid passageway 82 connects second opening 84 and first surface 40 for providing fluid communication therebetween during rebound of damper 10. Preferably, piston end 31 has a plurality of fluid passageways 80, 82 spaced radially about bore 37. First 80 and second 82 fluid passageways may include a common portion 85 through which fluid may flow during a compression stroke or a rebound stroke as depicted. Fluid passageways 80, 82 may have any suitable cross-section.

First 51 and second 52 orifice discs are interposed between first 40 and second 42 surfaces within a portion of fluid passageways 80, 82. A coil spring 86 is interposed between discs 47, 49 and biases them away from one another to inhibit the flow of fluid through fluid passageways 80, 82. Discs 47, 49 are disposed within a cavity formed between two halves which form the piston end 31. Discs 51, 52 have at least one orifice 87 and are movable toward one another when coil spring 86 is compressed, which permits fluid flow through the fluid passageways during low speed piston movement, as will be better appreciated from the discussion below.

Fluid flow during low speed bypass is shown in FIGS. 4A and 4B. FIG. 4A depicts low speed bypass during low speed rebound. As indicated by the arrow, fluid in rebound chamber 34 enters first passageway 80 and exerts pressure on second orifice disc 52 thereby moving second orifice disc 52 toward first orifice disc 51 and compressing coil spring 86. Fluid enters the common portion 85 of fluid passageways 80, 82 and exits through the orifices 87 in the first orifice disc 51. Conversely, FIG. 4B depicts low speed bypass during low speed compression. As indicated by the arrow, fluid in compression chamber 32 enters second passageway 82 and exerts pressure on first orifice disc 51 thereby moving first orifice disc 51 toward second orifice disc 52 and compressing coil spring 86. Fluid enters common portion 85 of fluid passageways 80, 82 and exits through orifices 87 in second orifice disc 52.

Fluid flow during high speed bypass is shown in FIGS. 5A and 5B. FIG. 5A depicts high speed bypass during high speed rebound. Fluid flows through orifice discs 51, 52 as described above in the context of FIG. 4A. Due to the increased pressure within first fluid passageway 80, the force of the fluid against deflective disc 47 causes disc 47 to deflect and permits the fluid to exit first opening 78, in addition to exiting through orifice 87 in orifice disc 51. The fluid is permitted to move from rebound chamber 34 to compression chamber 32 at an increased rate as compared to low speed bypass. Conversely, FIG. 5B depicts high speed bypass during high speed rebound. Fluid flows through orifice discs 51, 52 as described above in the context of FIG. 4B. Due to the increase pressure within second fluid passageway 82, the force of the fluid against deflective disc 49 causes disc 49 to deflect and permits the fluid to exit second opening 84, in addition to exiting through orifice 87 in orifice disc 52. The fluid is permitted to move from compression chamber 32 to rebound chamber 34 at an increased rate as compared to low speed bypass.

The above configurations utilizing deflective discs 47, 49 yields adequate digressive performance. As may be seen by the chart in FIG. 8, deflective discs 47, 49 achieve previously set performance targets. The piston force compared to piston velocity increases at a rapid rate to provide a stiff ride, or little damping, at low piston speeds (approximately less than 200 mm/s on the graph). The piston force compared to piston velocity increases at a substantially less rapid rate to provide a soft ride, or increased damping at high piston speeds (approximately greater than 200 mm/s on the graph). However, increased digressivity is desirable, that is, a steeper curve at low piston speeds and a flatter curve at high piston speeds is desirable.

Figure 6:
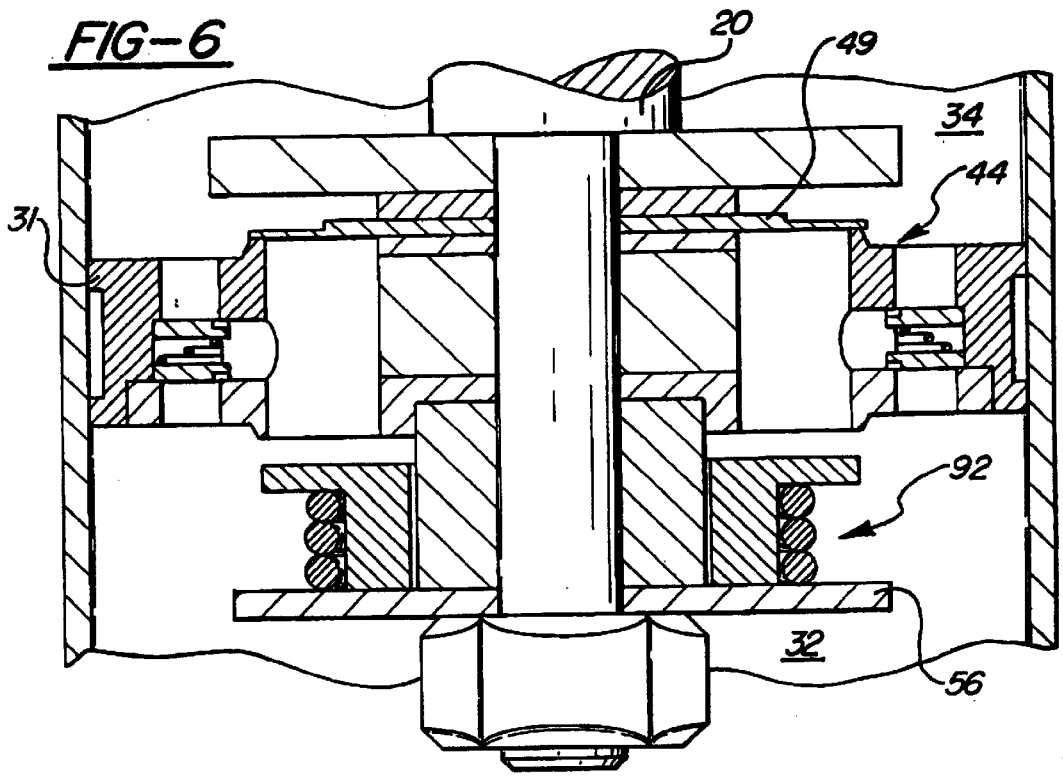
FIG. 6 is the piston valve assembly having deflective compression discs and a rebound blow-off valve with low speed bypass valves.
Figure 7:
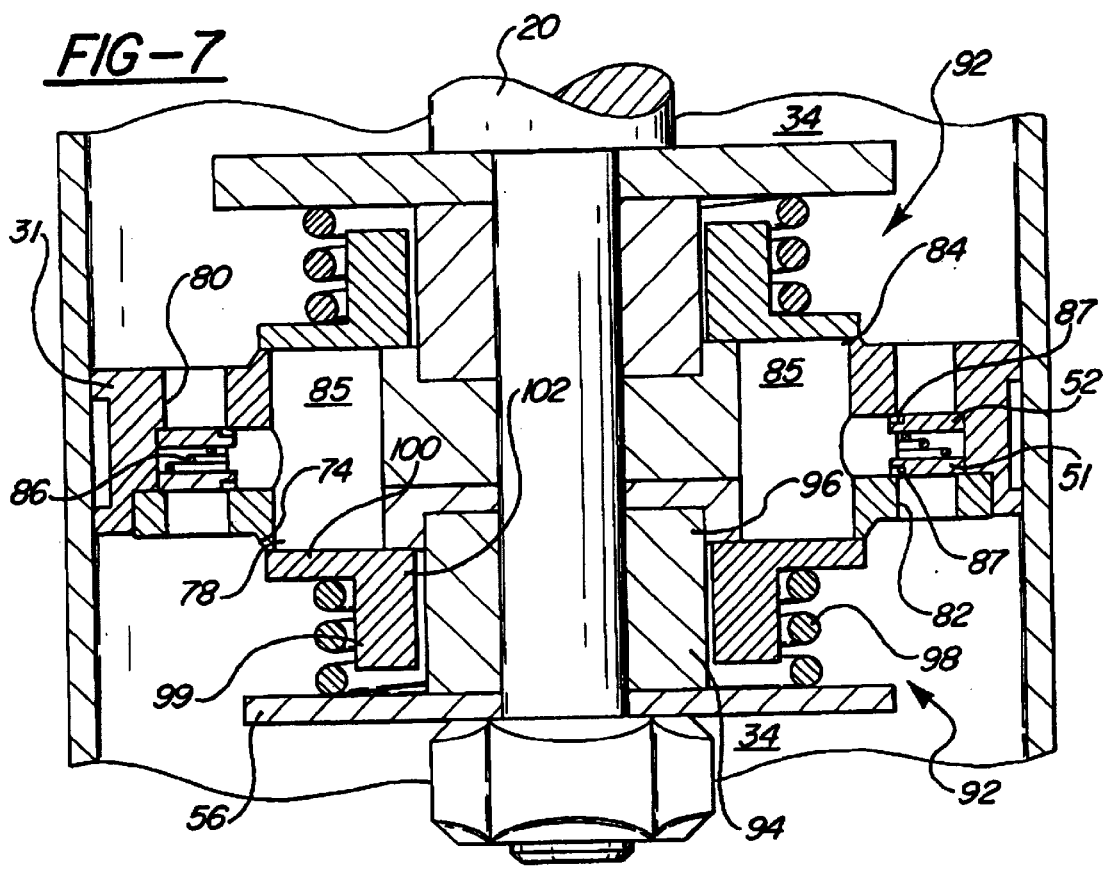
FIG. 7 is the piston valve assembly having compression and rebound blow-off valves with low speed bypass valves.

Increased digressivity is achieved by utilizing a blow-off valve assembly 92 for high speed bypass as a rebound valve assembly, as shown in FIG. 6, as a compression valve assembly (not shown), or as both a rebound and compression valve assembly as shown in FIG. 7.

Referring now to FIG. 7, blow-off valve assembly 92 provides high speed damping and includes a blow-off valve 94, a spacer sleeve 96, and a spring 98, which are secured to piston end 31 in the same manner as deflective discs 47, 49. Since each blow-off valve assembly 92 is generally the same, the blow-off valve assembly 92 utilized as rebound valve assembly will be discussed. Blow-off valve assembly 92 is movable between an open position (shown in FIG. 6), which is in spaced relation from first surface 40 and abuts stop 56, and a closed position (shown in FIG. 7) adjacent to annular seat 74. Blow-off valve 94 has a hollow cylindrical portion 99 with a flange 100 extending transversely from an end 102 thereof. Blow-off valve 94 may be manufactured from steel, powdered metal or any other suitable material.

Spring 98 is interposed between stop 56 and flange 100 for biasing blow-off valve 94 to the closed position. Cylindrical spacer sleeve 96 is disposed within hollow cylindrical portion 99 and abuts stop 56 and first surface 40. Spacer sleeve 96 provides a bearing surface for blow-off valve 94 as it moves between the open and closed positions.

As mentioned above, spring 98 biases blow-off valve 94 to the closed position (FIG. 7). Spring 98 is installed between stop 56 and blow-off valve 94 with a preload sufficient to prevent blow-off valve 94 from moving to the open position (FIG. 6) during low speed piston rebound. Spring 98 preferably has a low spring rate so that once high piston speed is reached blow-off valve 94 will move completely to the open position. A helical spring manufactured from a wire with a circular cross-section wound in a cylindrical shaped helix accomplishes these design objectives. Changing the preload and spring rate permits the damping characteristics at high speed to be easily calibrated for different vehicle applications.

The operation of blow-off valve assembly 92 will again be discussed in terms of rebound piston movement. During low speed rebound, such as a vehicle cornering maneuver, fluid in rebound chamber 34 enters first passageway 80 and exerts pressure on second orifice disc 52 thereby moving second orifice disc 52 toward the first orifice disc 51 and compressing coil spring 86. Fluid enters common portion 85 of fluid passageways 80, 82 and exits through orifices 87 in first orifice disc 51. During high speed rebound, the fluid flows through the low speed bypass valve, as discussed above. In addition, the increased force against flange 100 from the increased pressure causes spring 98 to compress and blow-off valve 94 to move from the closed position (FIG. 7) to the open position (FIG. 6). In the open position, the fluid also flows through first fluid passageway 80 and exits first opening 78 past outer annular seat 74.

Figure 8:
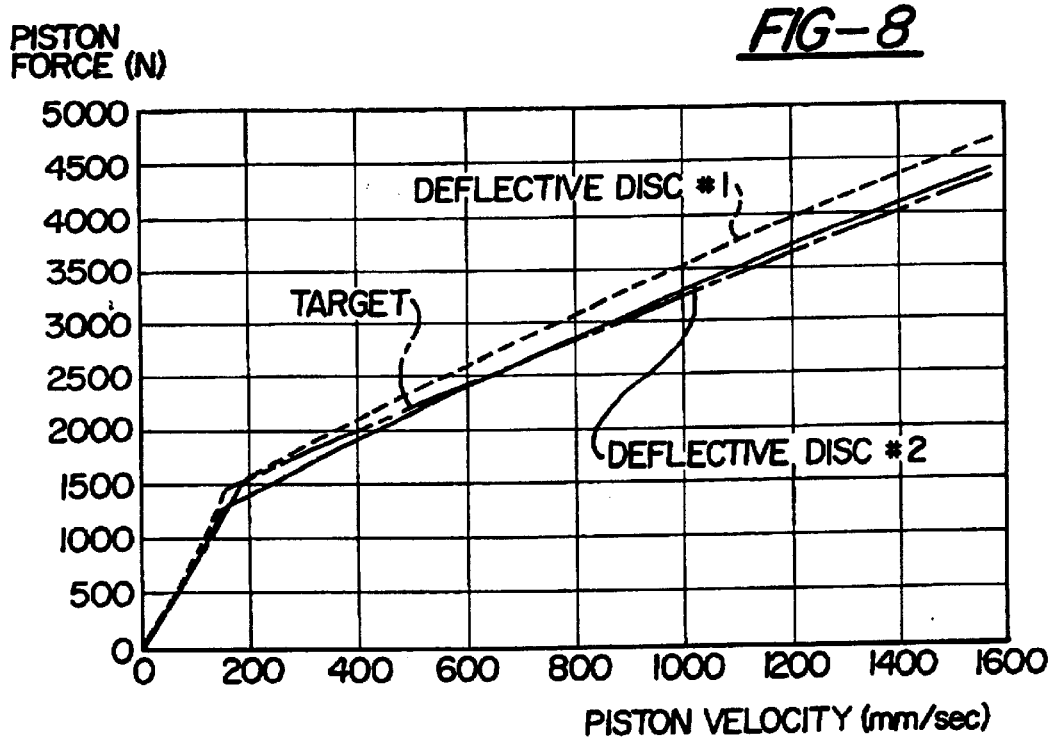
FIG. 8 is ph of force v. velocity for deflective discs.
Figure 9:
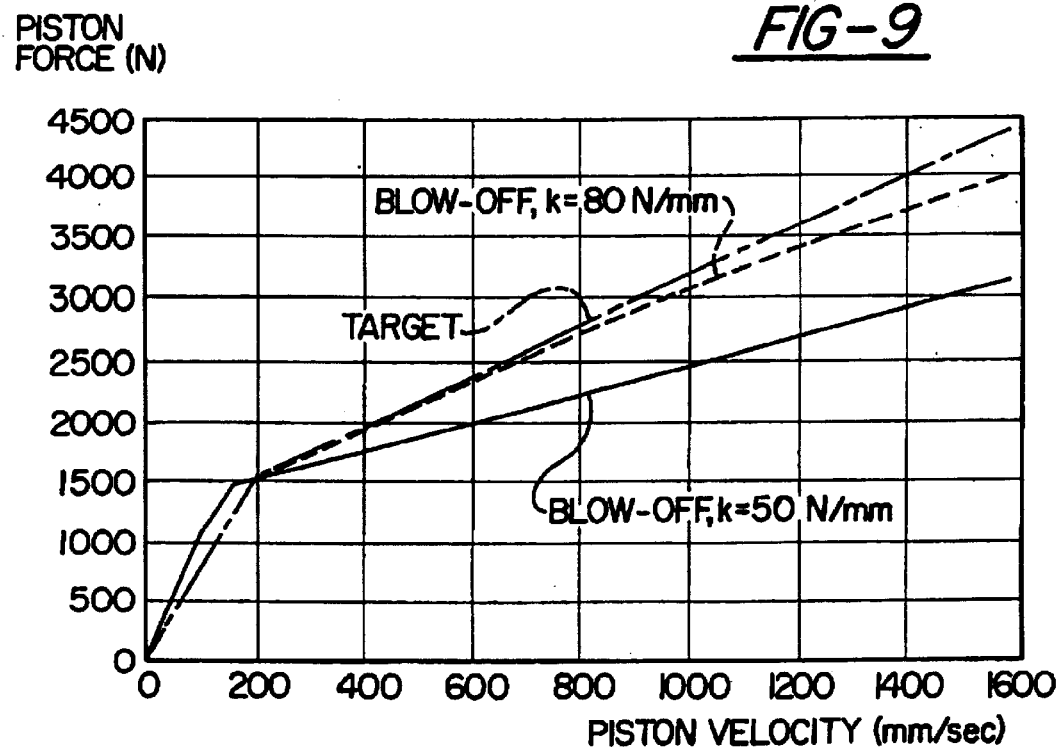
FIG. 9 is a graph of force v. velocity for blow-off valves.

As shown in FIG. 9, greater digressivity is achieved with blow-off valve assemblies 92 of the present invention as compared to the deflective discs, shown in FIG. 8. A blow-off valve assembly with a spring 98 having a spring rate of 80 N/mm is more digressive than previous targets for high speed damping. A blow-off valve assembly with a spring 98 having a spring rate of 50 N/mm, assuming the same preload, is even more digressive because blow-off valve 94 will move more quickly from the closed position to the open position under the same amount of force.

It is to be understood that a different type of low speed bypass valve may be used other than the one depicted in the Figures. For example, coin slots or notches pressed into the outer annular seat or orifice discs disposed between the blow-off valve and annular seats may be used to permit fluid to exit the openings into the reservoir chamber. Further, the blow-off valve assembly may be used without low speed bypass valves in other mono-tube applications in which a flatter piston force v. piston velocity curve is desirable.

What is claimed is:

1. A piston valve assembly for regulating the flow of fluid through a mono-tube fluid vehicle damper, said assembly comprising:

a piston rod;

a piston end having opposing first and second surfaces secured to said piston rod by a connector;

a first outer annular seat spaced radially from said piston rod and extending from said first surface;

a first fluid passageway connecting a first opening between said piston rod and said first outer annular seat and said second surface for providing fluid communication therebetween;

a first blow-off valve secured to said piston end, biased toward said first outer annular seat and abutting said first annular seat when said first blow-off valve is in a closed position, said first blow-off valve movable to an open position away from said first surface;

a first low speed bypass valve interposed between said first passageway and said second surface for permitting fluid to exit said first fluid passageway past said first blow-off valve when said first blow-off valve is in said closed position; and wherein said first low speed bypass valve comprises first and second discs interposed between said first and second surfaces within a portion of said first fluid passageway, and a spring member for biasing said discs away from one another, said first disc having an orifice and said second disc movable toward said first disc when said spring member is compressed for permitting fluid to move past said second disc through said first fluid passageway and exit through said orifice.

2. A piston valve assembly for regulating the flow of fluid through a mono-tube fluid vehicle damper, said assembly comprising:

a piston rod;

a piston end having opposing first and second surfaces secured to said piston rod by a connector;

a first outer annular seat spaced radially from said piston rod and extending from said first surface;

a first fluid passageway connecting a first opening between said piston rod and said first outer annular seat and said second surface for providing fluid communication therebetween;

a first blow-off valve having a hollow cylindrical portion with a first flange extending transversely from an end thereof with said first flange adjacent and abutting said first outer annular seat when said first blow-off valve is in a closed position, said piston rod and connector securing said blow-off valve to said piston end, said first blow-off valve movable to an open position away from said first surface;

a first low speed bypass valve interposed between said first passageway and said second surface for permitting fluid to exit said first fluid passageway past said first blow-off valve when said first blow-off valve is in said closed position; and a first helical spring engaging said first blow-off valve for biasing said first blow-off valve to said closed position, wherein said first low speed bypass valve comprises first and second discs interposed between said first and second surfaces within a portion of said first fluid passageway, and a spring member for biasing said discs away from one another, said first disc having an orifice and said second disc movable toward said first disc when said spring member is compressed for permitting fluid to move past said second disc through said first fluid passageway and exit through said orifice.

* * * * *